US005543945A

United States Patent [19]

Kimura et al.

[11] Patent Number: 5,543,945

[45] Date of Patent: Aug. 6, 1996

[54] METHOD OF DRIVING AN LCD EMPLOYING COMBINING TWO VOLTAGES WHICH CHANGE POLARITY AT DIFFERENT TIMES IN A FRAME

[75] Inventors: Yuji Kimura, Yokohama; Eiichi Ohta, Kawasaki; Hitoshi Kondo, Machida; Masaetsu Takahashi, Yokohama; Kenji Kameyama, Sagamihara; Katsuyuki Yamada, Mishima, all of Japan

[73] Assignee: Ricoh Company, Ltd., Tokyo, Japan

[21] Appl. No.: 257,437

[22] Filed: Jun. 8, 1994

Related U.S. Application Data

[63] Continuation of Ser. No. 834,212, Feb. 12, 1992, abandoned.

[30] Foreign Application Priority Data

Feb. 14, 1991 [JP] Japan .................................... 3-042645
Sep. 2, 1991 [JP] Japan .................................... 3-248232

[51] Int. Cl.[6] ............................ G02F 1/1343; G09G 3/36

[52] U.S. Cl. ................................ 359/55; 359/57; 359/58; 345/100; 345/96

[58] Field of Search ................................. 359/55, 56, 57, 359/58, 59, 60, 51, 52; 340/784; 345/91, 96, 100

[56] References Cited

U.S. PATENT DOCUMENTS 4,300,137 11/1981 Fujita et al. ............................. 359/55
4,413,256 11/1983 Yasuda et al. ............................ 359/55
4,560,982 12/1985 Sonehara et al. ......................... 359/57
4,730,140 3/1988 Masubuchi ................................ 359/57
4,842,371 6/1989 Yasuda et al. ............................ 359/59
4,945,352 7/1990 Ejiri .......................................... 359/55
5,057,928 10/1991 Nagashma et al. ....................... 345/96
5,107,533 5/1992 Okumura ................................. 359/55
5,122,790 6/1992 Yasuda et al. ............................ 359/55
5,148,118 2/1993 Yamazaki ................................. 359/55
5,202,676 4/1993 Yamazaki ................................. 359/55
5,247,376 9/1993 Wakai ...................................... 359/55

OTHER PUBLICATIONS

Kaneko "Liquid Crystal TV. Displays", 1987 KTK Scientific Publishers pp. 188–199.

*Primary Examiner*—William L. Sikes
*Assistant Examiner*—Kenneth Packer
*Attorney, Agent, or Firm*—Oblon, Spivak, McClelland, Maier & Neustadt

[57] ABSTRACT

The present invention discloses a method of operating an active matrix liquid crystal display device having a liquid crystal layer between a pair of substrates and at least one active device to each of picture element electrodes on at least one of the substrates, so that a driving signal applied to a picture element electrode during one frame cycle is always on a side of a voltage having an identical polarity, which is substantially free from scattering in the display, can be operated at a low driving voltage and obtain high contrast.

6 Claims, 10 Drawing Sheets

FRAME INVERSION WAVEFORM, ALL ON

LINE INVERSION DRIVING WAVEFORM. ALL ON

METHOD OF DRIVING AN LCD EMPLOYING COMBINING TWO VOLTAGES WHICH CHANGE POLARITY AT DIFFERENT TIMES IN A FRAME

This application is a Continuation of application Ser. No. 07/834,212, filed on Feb. 12, 1992, now abandoned.

BACKGROUND OF THE INVENTION

1. Field of the Invention

The present invention concerns a method of operating an active matrix liquid crystal display device having a liquid crystal layer between a pair of substrates and at least one active device to each of picture element electrodes on at least one of the substrates, so that a driving signal applied to one picture element electrode in one frame cycle is always on a side of a voltage having an identical polarity.

2. Discussion of the Background

So far, in an active matrix liquid crystal display device, cross talk occurs by a driving signal applied during a non-selection period and scattering in a display appears. Particularly, in a frame inversion type, since the selection time on the first scanning line is different from that on the $n_{th}$ scanning line, r.m.s. voltage values to the liquid crystal layer are different even if an identical data signal is inputted and scattering in a display appears frequently.

FIG. 7 shows various waveforms in the conventional frame inversion operation method in the active matrix device. In the drawing, the solid line indicates a driving signal waveform, while the broken line and the hatched portion indicate the waveform of the r.m.s. voltage applied to the liquid crystal layer. As apparent from the drawing, the r.m.s. voltage is different on end of the scanning lines even if the data voltage of the same condition is inputted, and scattering in a display occurs frequently.

In the line inversion operation method, the data signal swings between "+" and "–" regions in the period other than the selection period, which not only increases the driving voltage but also makes the condition for the signal input pattern being different greatly depending on the picture display pattern, and also causes scattering in the display and worsen the contrast as compared with that in the frame inversion operation method. As can be seen from the drawing, although the conditions are identical for all of the scanning lines during the selection period and there is no scattering in the display, the driving signal swings between "+" and "–" regions during the non-selection period, which hinders to hold the voltage and increase the driving voltage. Further, since there is a large leak current, high contrast can not be obtained.

Further, although it is highly desirable to use polymer dispersed liquid crystals as the liquid crystals in view of its performance, such liquid crystals require a high driving voltage and, accordingly, it is difficult for active matrix driving. Although there has been an example using a varister capable of withstanding a high voltage as the switching device, its driving is difficult since there is no high voltage resistant driving IC and in view of the stability of the switching device.

The present inventors have made an earnest study for developing an active matrix liquid crystal display device with no scattering in the display, of a high contrast and operable at a low driving voltage and, as a result, have accomplished the present invention based on the finding that the object can be attained by keeping a driving signal applied to a picture element electrode, each having an active device, during one frame cycle always on a side of a voltage having an identical polarity.

FIGS. *6a* and *6b* are graphs representing typical I-V characteristic and lnI-√V characteristic of the MIM device.

Figure 7:
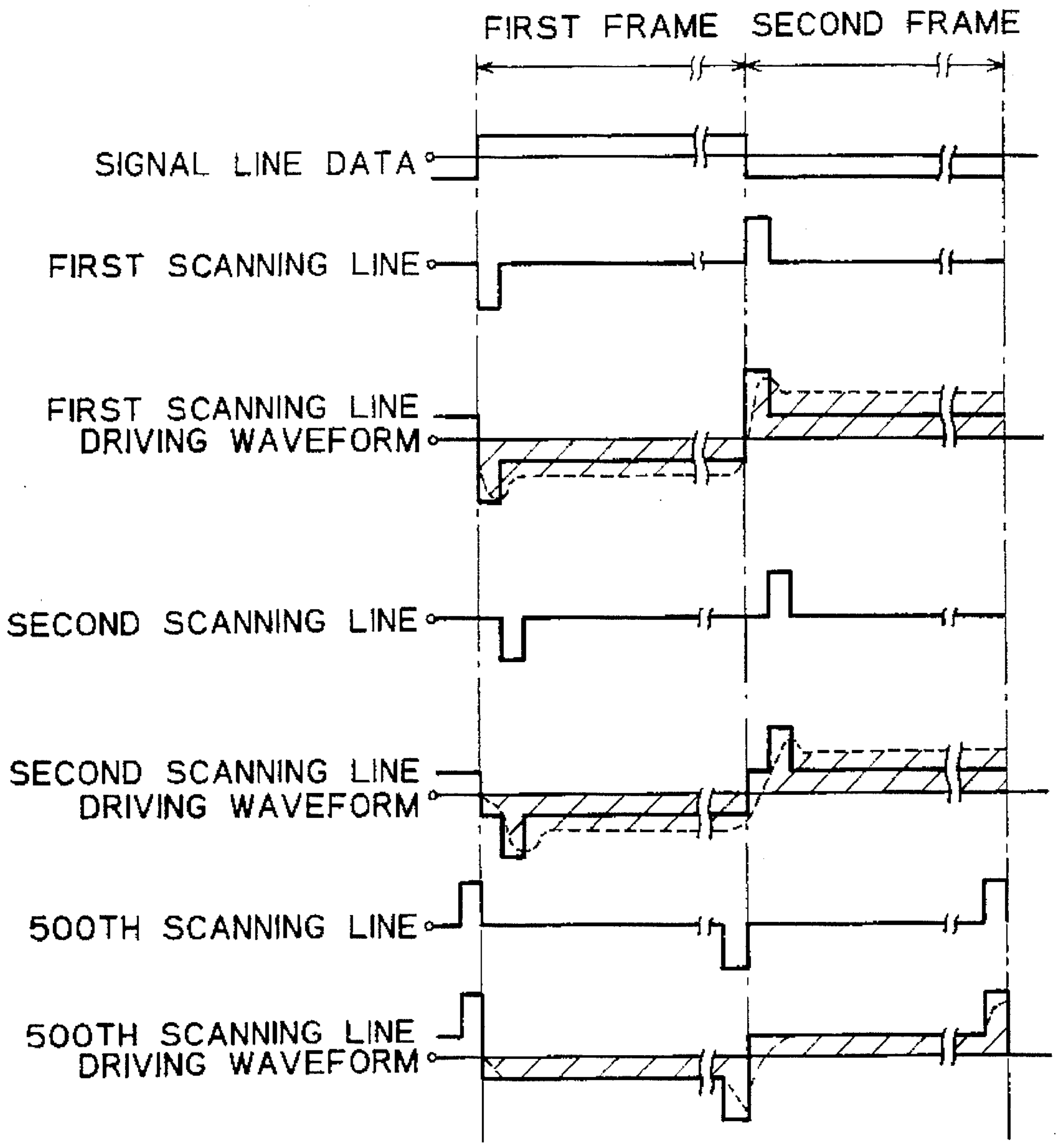
Fig. 7 PRIOR ART

FIG. 7 shows various waveforms of an active matrix display device operated by a conventional frame inversion method.

Figure 8:
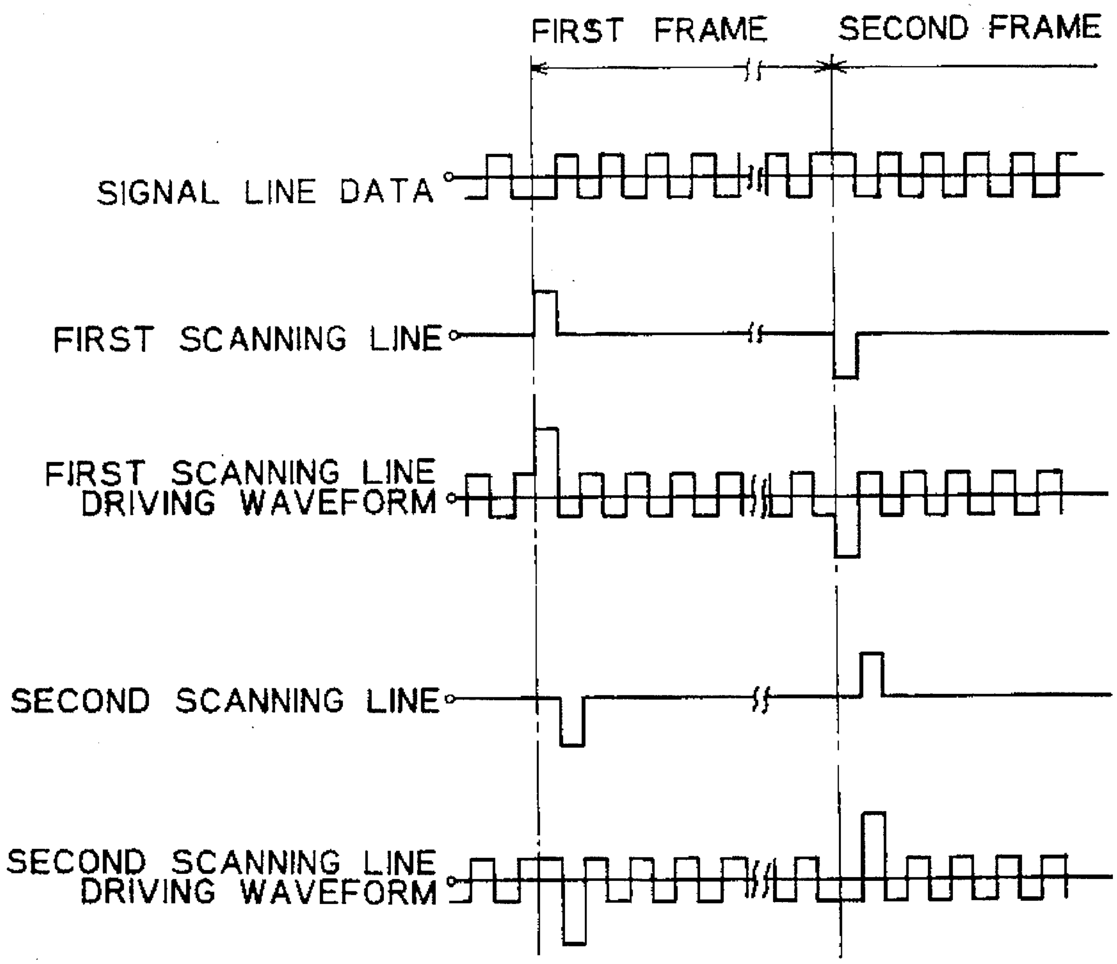
Fig.8 PRIOR ART

FIG. 8 shows waveforms operated by a conventional line inversion method.

Figure 9:
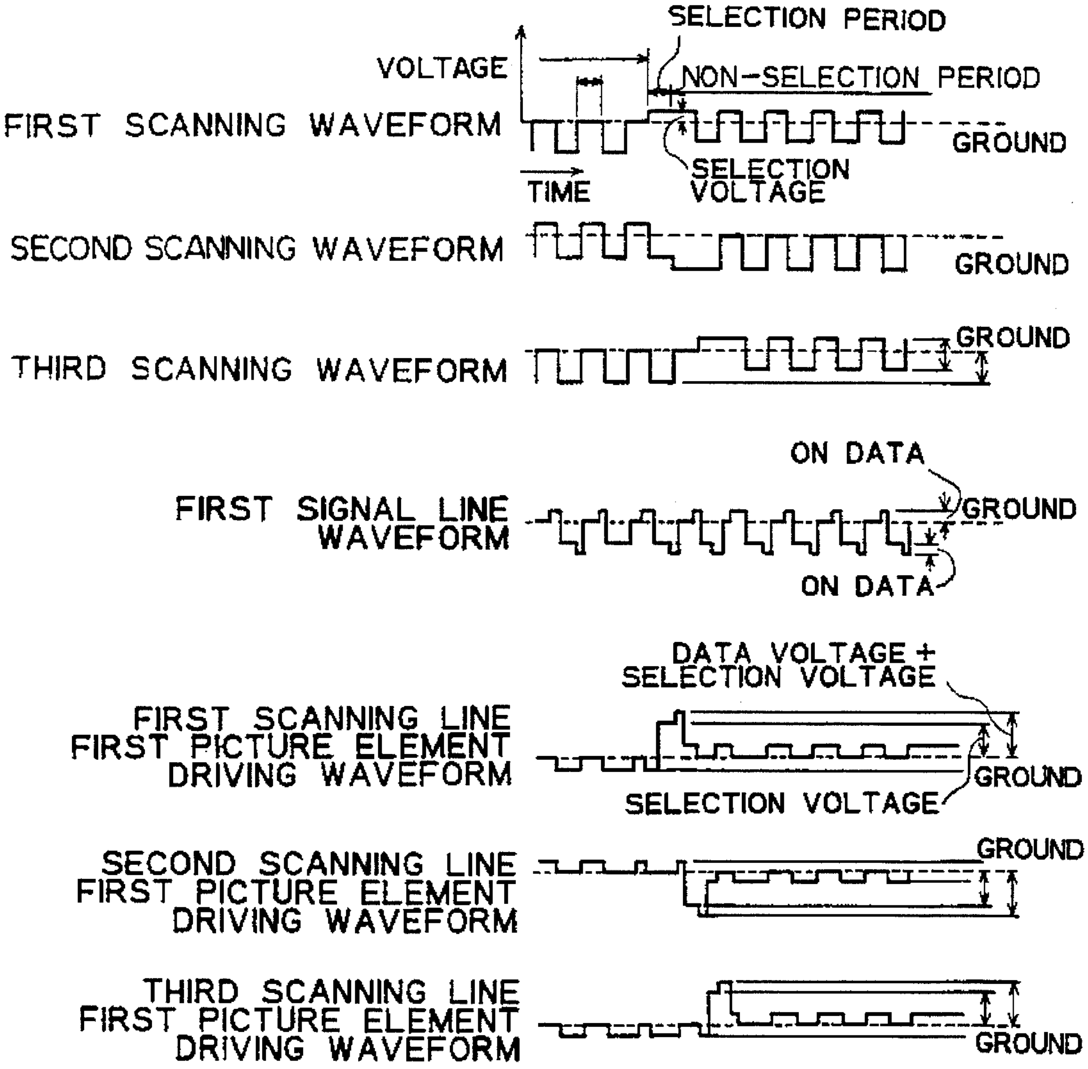

FIG. 9 shows waveforms of an active matrix display device operated by the operation method according to the present invention.

Figure 10:
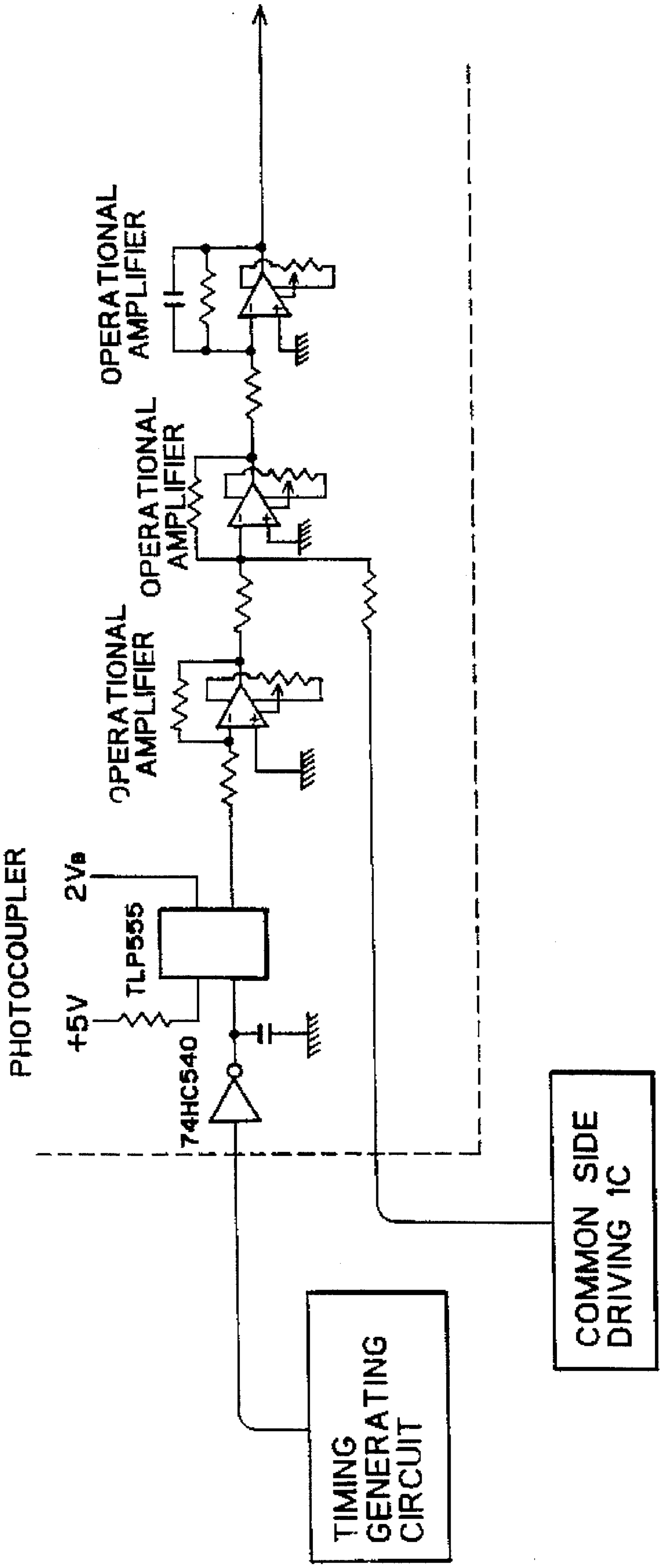

FIG. 10 shows an example of a driving circuit that can practice the operation method according to the present invention.

Figure 11:
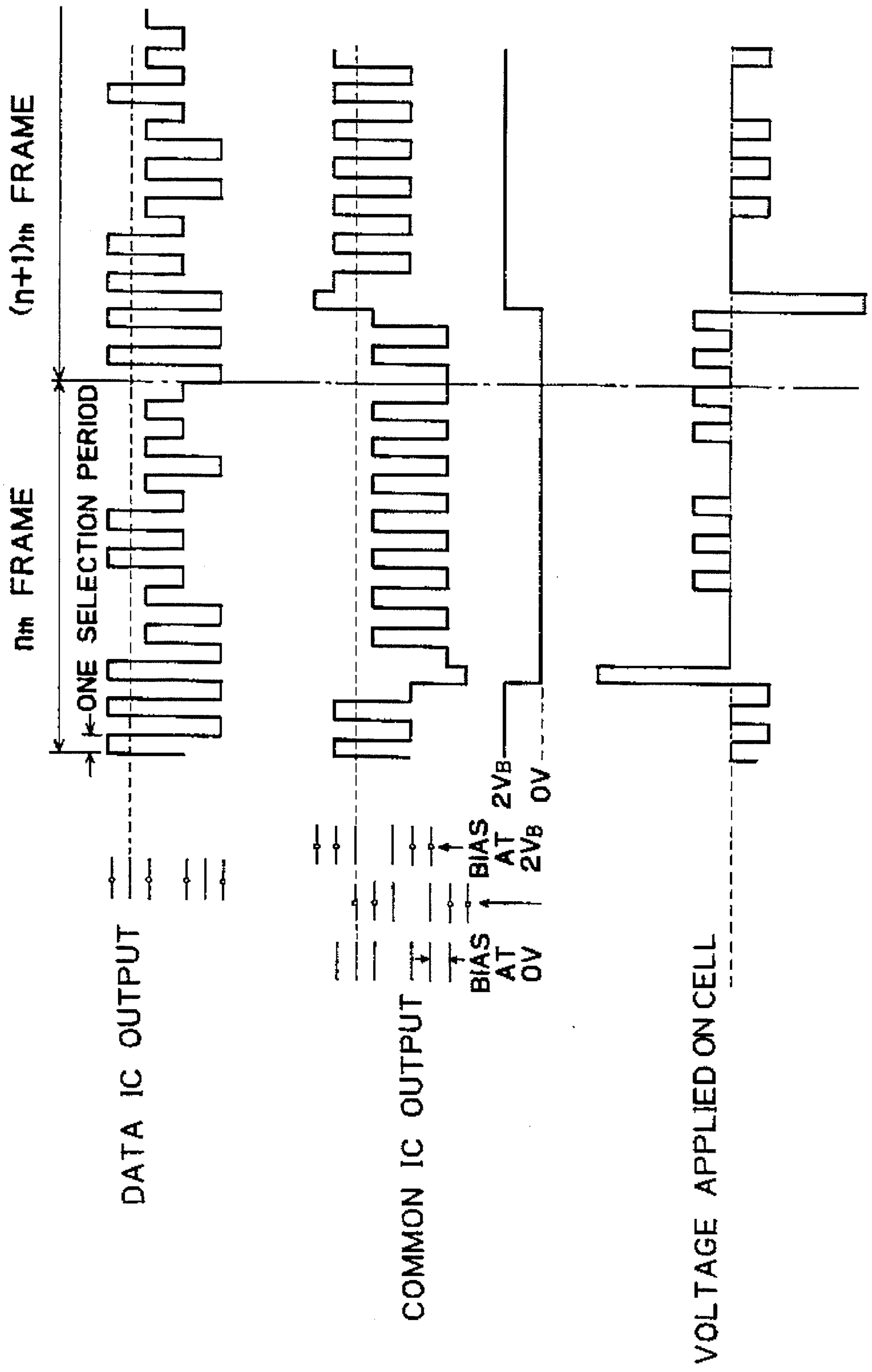

FIG. 11 shows an example of an output waveform applied to a picture element electrode when the present invention is practiced by using the driving circuit shown in FIG. 10.

FIG. **12*a* shows a driving waveform shown in FIG. 9.. FIG. 12*b* shows a driving waveform when a constant voltage having an identical polarity is added in the operation method in FIG. 12*a*** above.

Figure 13:
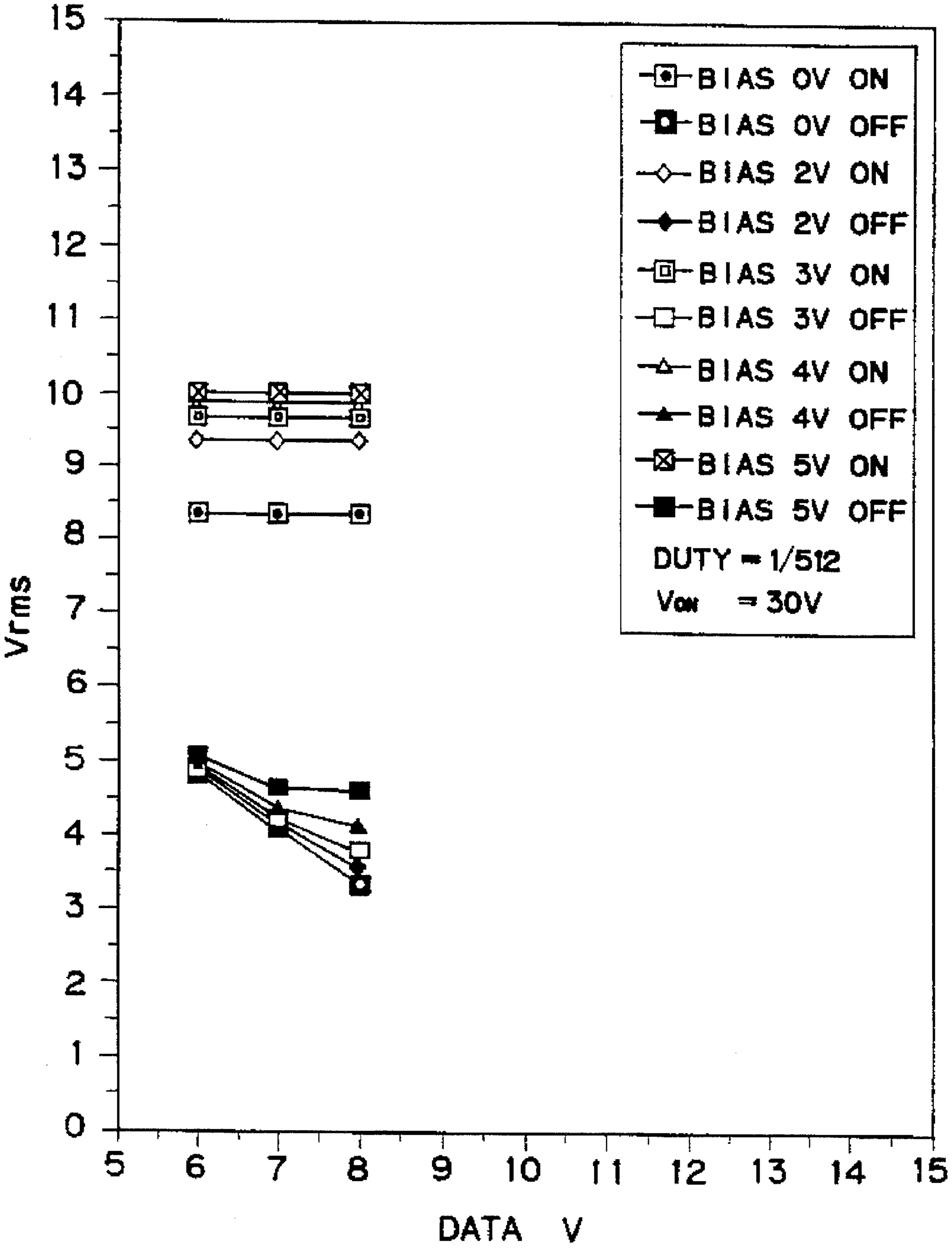

FIG. 13 shows a r.m.s. voltage applied to a liquid crystal layer when the present invention is practiced by adding a constant voltage having an identical polarity.

Reference numerals shown in FIGS. 1 to 5 have the following meanings.

| | |
|---|---|
| 1 | Substrate |
| 1' | Insulating substrate |
| 2 | Hard carbon film (insulating film) |
| 3 | Liquid crystal |
| 4 | Picture element electrode |
| 4' | Common electrode |
| 5 | Active device |
| 6 | Second conductor (Base line) (Upper electrode) |
| 7 | First conductor (Lower electrode) |
| 8 | Aligning film |
| 9 | Gap material |

SUMMARY OF THE INVENTION

An object of the present invention is to provide a method of operating an active matrix liquid crystal display device having a liquid crystal layer between a pair of substrates and picture element electrodes, each of which have at least one active device, on at least one of the substrates, wherein a driving signal added to a picture element electrode during one frame cycle is always on a side of a voltage having an identical polarity.

Another object of the present invention is to provide a method of operating the active matrix liquid crystal display device wherein a constant voltage having an identical polarity is always added to the driving signal.

A further object of the present invention is to provide a method of operating an active matrix liquid crystal display device that can operate with less scattering in a display, at a high contrast and with a low driving voltage.

DETAILED EXPLANATION OF THE INVENTION

In accordance with the operation method of the present invention, an active matrix liquid crystal display device having a liquid crystal layer between a pair of substrates in which each of picture element electrodes on at least one of the substrates has at least one active element, can be operated with less scattering in a display, at a high contrast and with a low driving voltage by holding a driving signal applied to a picture element electrode during one frame cycle always on a side of a voltage having an identical polarity.

Further, the driving voltage can be lowered further by adding always a constant voltage to the driving signal.

The present invention will now be explained with reference to the attached drawings.

FIG. 9 shows an example of a driving waveform in the present invention. As can be seen from the drawing, the polarity of the driving waveform is inverted on every line inversion, and a voltage having an identical polarity with that of a selection voltage is applied also during the non-selection period within one from cycle after one line is selected. The one frame cycle referred to herein is a sum of the selection period and the non-selection period, namely, the period from one selection to the next selection.

By the method described above, the driving waveform of the identical conditions is always applied to all picture element electrodes described above, and as a result there is no scattering in the display, the leak current is reduced and the driving voltage is lowered since there is no voltage of opposite polarity.

FIG. 9 shows an example of the driving waveform for the explanation sake therefor, accordingly, data are not restricted only to the data of a pulse width gradation method used herein but other data such as those of an amplitude modulation method can also be used. Further, the bias ratio, input waveform, etc. shown in this drawing are not restricted only to them.

Figure 12A:
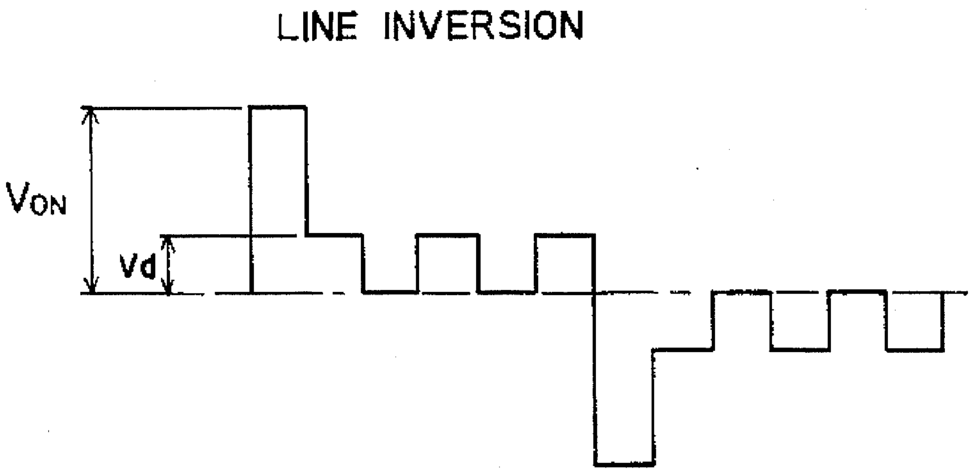
Figure 12B:
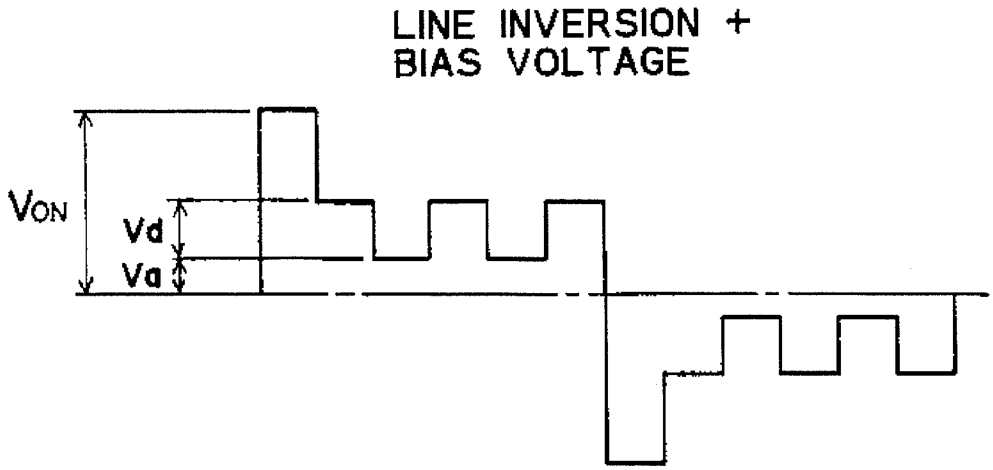

FIG. 12*a* is an enlarged and simplified view of an example of the driving waveform in FIG. 9 for easier understanding and FIG. 12*b* shows a driving waveform when a constant voltage having an identical polarity is applied to the waveform and Vd denotes a data voltage and Va denotes an added voltage. The driving waveform shown in FIG. 12 can be formed by the driving circuit shown in FIG. 10 and both of the waveforms shown in FIGS. 9 and 12 can be outputted by changing the bias voltage.

FIG. 10 shows an example of the driving circuit capable of practicing the driving method of the present invention and FIG. 11 shows an example of output waveforms in a case of using this circuit. This figure (FIG. 11) shows driving waveforms at a certain instant, i.e., shows a data output waveform, a common (scanning) output waveform and a waveform synthesized therefrom (driving waveform) from above to below. The waveforms are given while taking the voltage on the ordinate and the time on the abscissa, and show an example of the output of $n_{th}$ frame and $(n+1)_{th}$ frame. The selection cycle in the drawing is for one picture element and a duty ratio is obtained by dividing it by the frame cycle. In other words, the duty ratio is a reciprocal of the number of scanning lines that can be written per one frame.

Description will be made further to the effect of the operation method according to the present invention. Although the effect will be explained with respect to a liquid crystal display device using a MIM type device for facilitating the explanation, an application of the present invention is not, of course, limited only to the display device using the MIM type device.

The MIM type device in the display device serves to make an electric current conductive by lowering the resistance during a selection period and input electric charges into the liquid crystal layer, while reducing the electric discharge from the liquid crystal layer by increasing the resistance during a non-selection period thereby maintaining the electric charges in the layer as they are. However, in the conventional operation method, conduction of the current through the MIM type device is not completely inhibited even in the resistance increase during the non-selection period, although little, and it causes electric discharge. This forms a leak current which, accordingly, levels up the driving voltage, lowers the contrast and causes an electric loss. Further, during the non-selection period, an electric field is often applied to the liquid crystal layer in the direction opposite to that of the field during the selection period and promotes a discharge of the electric charges from the layer. That is, electric charges in the liquid crystal layer charged during the selection period are released during the non-selection period and, if both ends of the liquid crystal layer are opened, this merely causes self discharge. However, since the active device and the common electrode are connected to the ends charges are released therethrough. If the voltage level during the non-selection period has an opposite polarity to the level during the selection period, release of the charges is increased making it necessary to increase the input amount of the charges during the selection period and leads to increase the driving voltage and lower the contrast.

Also in the operation method according to the present invention, charges in the liquid crystal layer are released during the non-selection period, it becomes possible to suppress the release of the charges from the liquid crystal layer and lower the driving voltage, by making the voltage level during the non-selection period have the identical polarity as the level during the selection period. Further, since the charges in the layer are maintained, the contrast is also enhanced. Furthermore, the foregoing effect can be increased more by adding a constant voltage of the identical polarity to the driving voltage.

This operation method of the present invention can be applied to all of the active matrix liquid crystal display devices and it is particularly effective for an active matrix device using a nonlinear two-terminal device which is prone to be affected by cross talk. Further, when the nonlinear two-terminal device is used for a MIM device having a hard carbon film as an insulator which can be formed at a room temperature, it is advantageous for fabrication the device having an increased area or a uniform quality.

Figure 1:
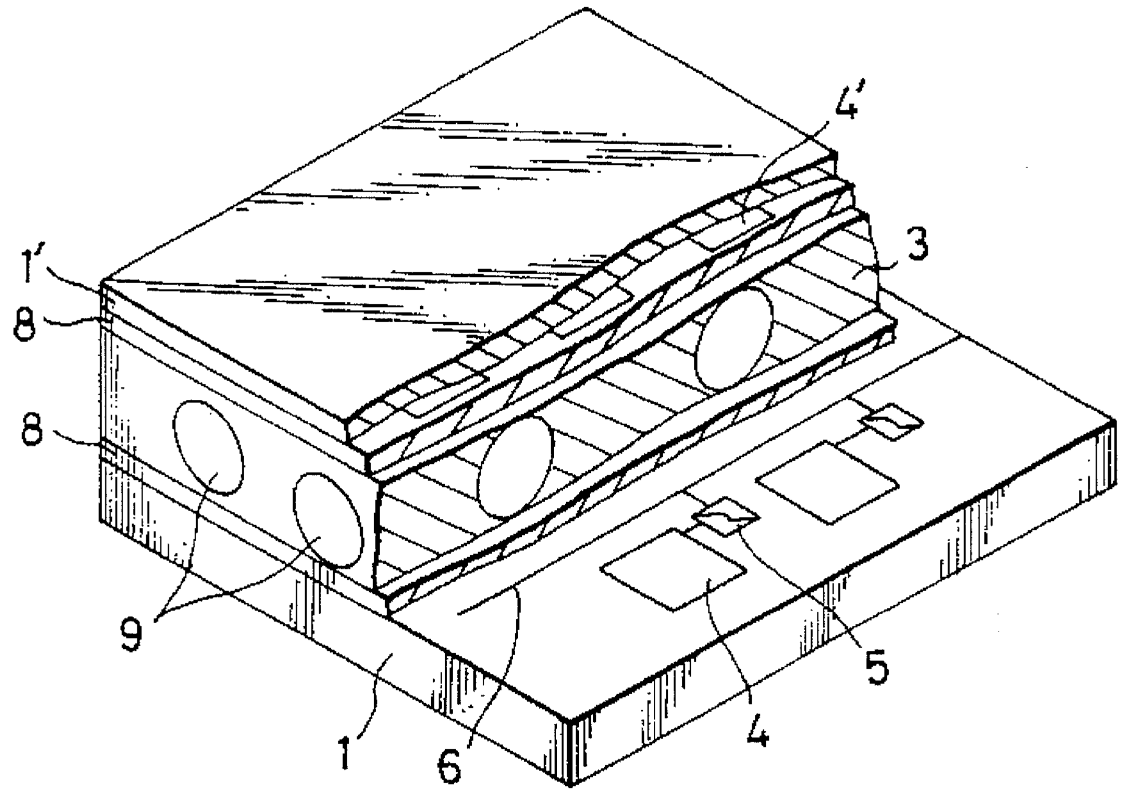
FIG. 1 is a perspective view of a display device using a MIM (Metal-Insulator-Metal) type device according to the present invention.
Figure 2:
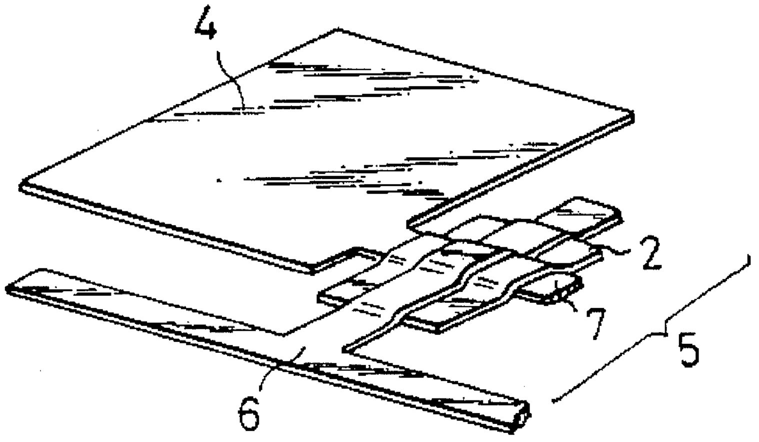
FIG. 2 is a perspective view illustrating the details of a picture element electrode and an active device in the display device of FIG. 1.

Description will now be made to a method of preparing an MIM device to which the operation method according to the present invention is applied with reference to FIGS. 1 and 2.

At first, transparent electrode material for a picture element electrode is deposited on a transparent insulating substrate 1, such as of a glass, a plastic plate or a plastic film by a method, for example, vapor deposition of sputtering and then patterned into a predetermined pattern to form a picture element electrode 4.

Then, a thin conductor film for a lower electrode is formed by a method, for example, vapor deposition or sputtering and then patterned to a predetermined pattern by means of a wet or a dry etching to form a first conductor 7, which is a precursor of a lower electrode, on which a hard carbon film 2 is coated, for example, by a plasma CVD process or an ion beam process and then patterned to a predetermined pattern by means of a dry etching, a wet etching or a lift-off technique by using resist to form an insulating film. Subsequently, a thin conductor film for a base line is coated on them by a method, for example, vapor deposition or sputtering and then patterned into a predetermined pattern to form a second conductor 6 which is a precursor of the base line. Finally, unnecessary portion of the lower electrode 7 is removed to expose a transparent electrode pattern and form a picture element electrode 4.

In this case, the constitution of the MIM device is not restricted only to the above but various modifications are possible such as those in which a transparent electrode is disposed to the uppermost layer after the fabrication of the MIM device, the transparent electrode serves as the upper or the lower electrode or an MIM device is formed to the side of the lower electrode.

The thickness for each of the lower electrode, the upper electrode and the transparent electrode is preferably within a range from several hundreds to several thousands Å, respectively. The thickness of the hard carbon film is preferably within a range from 100 to 8,000 Å, more preferably, 300 to 6,000 Å and further preferably, 500 to 5,000 Å.

Further, when a plastic substrate is used, since a heating treatment of the substrate to a high temperature is frequently necessary for a fabrication of an active matrix device using active devices, there exists a difficulty in a heat resistivity of the substrate. However, because a hard carbon insulating film of a good quality can be formed on the substrate even at a room temperature thereof, fabrication of the active matrix device on the plastic substrate can be done without trouble, and the image quality is also improved greatly.

Material used for an MIM device according to the present invention will be described in detail. As a material for the first conductor 7, which is a precursor of the lower electrode, Al, Ta, Cr, W, Mo, Pt, Ni, Ri, Cu, Au, indiuim-tin oxide (hereinafter referred to as 'ITO"), ZnO:Al, $In_2O_3$ and $SnO_2$ can be exemplified.

As a material for the second conductor 6, which is a precursor of the upper electrode (base line), Al, Cr, Ni, Mo, Pt, Ag, Ti, Cu, Au, W, Ta, ITO, ZnO:Al, $In_2O_3$ and $SnO_2$ can be exemplified. Among the above, Ni, Pt and Ag which have an excellent stability and reliability in I-V relationship are especially preferable.

The MIM device using the hard carbon film 2 as the insulator does not change its symmetricity even if the kinds of the electrode are changed and it can be seen from the relation: ln $I \propto \sqrt{V}$ that the device has a Pool Frenkel type conduction. It can also be seen from the foregoings that the upper electrode and the lower electrode may be combined in any manner for the MIM device of this kind. However, the device characteristic (I-V characteristic) may be degraded or varied depending on the bonding force and the state of the boundary between the hard carbon film and the electrode. It can be seen that Ni, Pt and Ag are also preferable if one takes the foregoings into consideration.

Figure 6A:
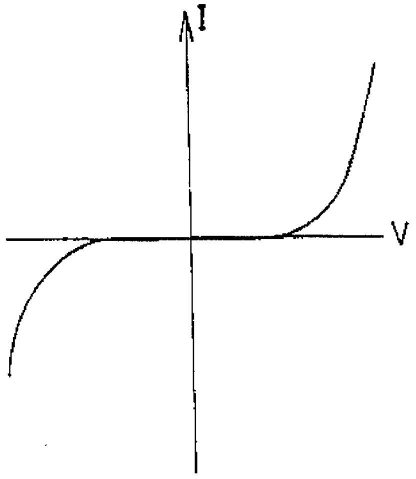
Figure 6B:
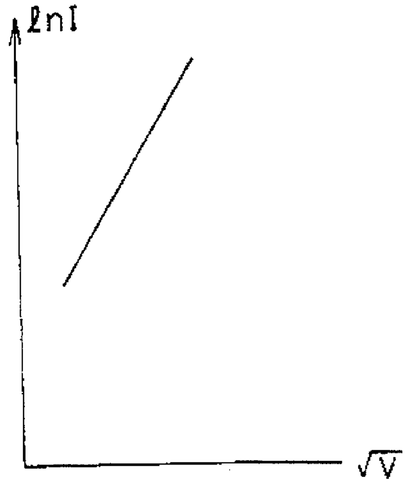

The I-V characteristics of the MIM device according to the present invention are shown in FIG. 6. The characteristics are also represented approximately by the following equations (1), (2) and (3):

$$I = K\exp(\beta V^{1/2}) \tag{1}$$

$$K = n\mu q/d\exp\left(\frac{-\phi}{kT}\right) \propto \frac{1}{\rho d}\ (T=\text{const}) \tag{2}$$

$$\beta = \frac{1}{kT}\left(\frac{q^3}{\pi\epsilon_1\epsilon_2 d}\right)^{1/2} \propto \frac{1}{\sqrt{\epsilon_1 d}}\ (T=\text{const}) \tag{3}$$

wherein:
I: electric current
V: applied voltage
conduction coefficient
β: Poole-Frenkel coefficient
n: carrier density
μ: carrier mobility
q: electron charge amount
φ: trap depth
ρ: specific resistivity
d: thickness of hard carbon film (Å)
k: Boltzman's constant
T: atmospheric temperature
$\epsilon_1$: dielectric constant of hard carbon
$\epsilon_2$: dielectric constant in vacuum A method of fabricating a liquid crystal display device using a twisted nematic (hereinafter referred to as "TN") liquid crystal will be described referring to FIG. 1.

As a first step, a transparent conductor for a common electrode 4', for example, ITO, ZnO:Al, ZnO:Si, $SnO_2$ or $In_2O_3$ is formed into a film of a thickness from several hundreds Å to several μm on an insulating substrate 1' by means of sputtering, vapor deposition or the like, and patterned in a stripe to form a common electrode 4'.

An aligning material 8 such as polyimide is attached to each of the surfaces of the substrate 1' having the common electrode 4' and the substrate 1 on which the MIM devices were previously disposed in a matrix, applied with a rubbing treatment and the substrates are attached with a sealing member and a gap member 9 was interposed therebetween to make the gap constant, and then liquid crystals 3 were sealed between the substrates to form a liquid crystal display device. In this way, a liquid crystal display device using the TN liquid crystals is obtained.

The polymer dispersed liquid crystal (hereinafter referred to as "PDLC") used in the present invention means a combination of a liquid crystal and a polymer and they are generally classified into the following two groups, (1) a film comprising a polymer network type liquid crystal layer in which liquid crystals are disposed so as to be surrounded by a three dimensional network structure formed with a polymer; and (2) a film comprising a polymer matrix type liquid crystal layer in which particulate liquid crystals are dispersed in the polymer matrix.

The method of fabricating the PDLC includes microencapsulation, hardening with UV ray or heat, casting or impregnation.

Characteristics of the PDLC and active TN liquid crystals are shown below.

TABLE 1

| Item | PDLC | TN Liquid Crystal |
|---|---|---|
| $V_{10}$ | 2–40 (V) | 1.2–2 (V) |
| $V_{90}$ | 6–100 (V) | 2.8–3.2 (V) |
| $V_{90}$–$V_{10}$ | 4–60 (V) | 0.6–1.4 (V) |
| ρ | >1 × 1010 (Ω cm) | >1 × $10^{12}$ (Ω cm) |

The PDLC has a features, such as, the response is rapid, it is bright because neither a polarizer nor an aligning film is necessary and a viewing angle is wide. However, since the driving voltage thereof is high, it has been difficult to drive PDLC by the active matrix.

In the case of the present invention, since the driving voltage is lowered, active matrix driving is possible even for the PDLC.

FIG. 13 shows a r.m.s. voltage applied to the liquid crystal layer when a constant voltage having an identical polarity is applied in the present invention. It shows that although ON voltage is increased by an addition of a bias, OFF voltage is not increased so much. It can be seen from the foregoing that the driving voltage is lowered by applying the constant voltage thereon.

The method of fabricating the active matrix liquid crystal display device using the PDLC is substantially the same as that using the TN liquid crystals, only with the differences in the method of fabricating the liquid crystal layer and having no aligning film.

For example, it is fabricated as described below.

(1) Cyanobiphenyl series nematic liquid crystals are mixed to a liquid comprising an epoxy resin and a hardener mixed at a predetermined amount, at a weight ratio of 4:1. A liquid crystal dispersion prepared by uniformly mixing the mixture by a homogenizer was coated on a transparent electrode and then cured by heating to 80° C. to prepare a polymer matrix type liquid crystal layer. Instead of the epoxy resin, polyvinyl alcohol, difunctional photocurable acrylic resin or the like can be used. As the liquid crystals, usual nematic liquid crystals such as an ester type, pyrimidine type or a mixture thereof can be used in addition to the cyano biphenyl type. The size of the liquid crystal particles is preferably less than about 10 μm and the content thereof is also preferably about 10 to 50% by weight.

(2) One part by weight of a nematic liquid crystals was added to 15% by weight of toluene solution containing 10 parts by weight of polymethylmethacrylate (PMMA). It was homogenized by stirring and coated on a transparent electrode, and then the solvent was removed by heating to prepare a polymer network liquid crystal layer. As the polymer usable for the polymer network liquid crystals, there can be mentioned, for example, usual polymeric compounds such as acrylic resin, polystyrene, polycarbonate, polyvinyl alcohol, siloxane or ester type polymer, as well as an epoxy resin and polyamide. As the liquid crystals, those similar to the polymer matrix type can be exemplified. A suitable content of the liquid crystals is preferably about 60 to 90% by weight.

The polymer and the liquid crystals are not restricted only to those described above but any of materials can be used so long as the liquid crystals are dispersible in a polymer.

Description will now be made to the hard carbon film used in the MIM device. For forming the hard carbon film, a gas of an organic compound, in particular, a gas of a hydrocarbon is used. The organic compound does not necessarily have to be in a gas phase under normal temperature and normal pressure but any organic compound which can be gasified by heating or pressure reduction can also be used even when it is in a liquid or solid phase under normal conditions.

As the gas, those containing carbon elements, for example, alcohols, ketones, ethers, esters, CO and $CO_2$ can be used in addition to hydrocarbons. Among them, it is preferable to use a gas containing at least one of any hydrocarbons, for instance, paraffinic hydrocarbons such as, $CH_4$, $C_2H_6$, $C_3H_8$ and $C_4H_{10}$, acetylenic hydrocarbons such as, $C_2H_2$, olefinic hydrocarbons such as, $C_3H_6$ and $C_4H_8$, diolefinic hydrocarbons and aromatic hydrocarbons.

As a method for forming the hard carbon film from the gas described above, it is preferable to use a method which forms film-forming active species by way of a plasma state formed by a plasma process using an electric current such as DC current, low frequency wave, high frequency wave or microwave. However, a method of utilizing a magnetic field effect of depositing at a low pressure aiming for a large area film forming, an improved homogeneous film-forming and a low temperature film-forming are more preferable. As the method for forming the active species, there are a method of forming with a high temperature thermal decomposition, a method of forming by way of an ionized state by ionizing vapor deposition or ion beam vapor deposition, a method of forming via neutral particles generated by vapor deposition or sputtering, as well as a combination of the above.

The conditions for forming the hard carbon film are shown below taking a plasma CVD process as an example.

| | |
|---|---|
| RF output | 0.1 to 50 W/$cm^2$ |
| Pressure | $10^{-3}$ to 10 Torr |
| Deposition temperature | Room temperature to 350° C.; preferably room temperature to 250° C. |

In this plasma state, the starting gas is decomposed into radicals and ions which react with each other at a surface of the substrate and a hard carbon film is formed containing at least one of amorphous phase or extremely fine crystalline (size of crystals: several tens Å to several μm) phase both of which are essentially consisting of carbon and hydrogen atoms. The properties of the hard carbon film are shown in Table 2.

TABLE 2

| Item | Value |
|---|---|
| Specific Resistivity (p) | $10^6$–$10^{13}$ ohm · cm |
| Optical Band Gap (Egopt) | 1.0–3.0 eV |
| Hydrogen Amount in the Film [C(H)] | 10–50 atom % |
| $SP^3/SP^2$ 2 Ratio | 2/1–4/1 |
| Vickers Hardness (H) | Not higher than 9,500 kg/$mm^2$ |
| Refractive Index (n) | 1.9–2.4 |
| Defect Density | $10^{17}$–$10^{19}$/$cm^3$ |

Measuring methods for the properties shown in Table 1 are shown below.

Specific resistivity (ρ): Determined based on I-V relationship obtained by coplaner type cell.

Optical bandgap (Egopt): Absorption coefficient α is determined based on spectral characteristic, and Egopt is calculated by the following equation:

$$(\alpha h\upsilon)^{1/2}=\beta(h\upsilon-Egopt)$$

wherein h represents a plank constant and υ represents a frequency of light.

Hydrogen amount of film [C(H)]: Determined by integrating peaks in IR absorption spectra near 2,900 $cm^{-1}$ and multiplied with an absorption cross section A, namely, according to the following equation:

$$[C(H)]=A\int\alpha(v)/vdv$$

wherein a represents an absorption coefficient and v represents a number of waves.

$SP^3/SP^2$ ratio: Decomposing IR absorption spectrum into a Gaussian functions belonging to $SP^3$ and $SP^2$ and determined the ratio based on the area ratio of the functions.

Vickers hardness (H): By the microvickers meter.

Refractive index: With Elipsometer.

Defect density: According to Electron Spin Resonance.

Figure 3:
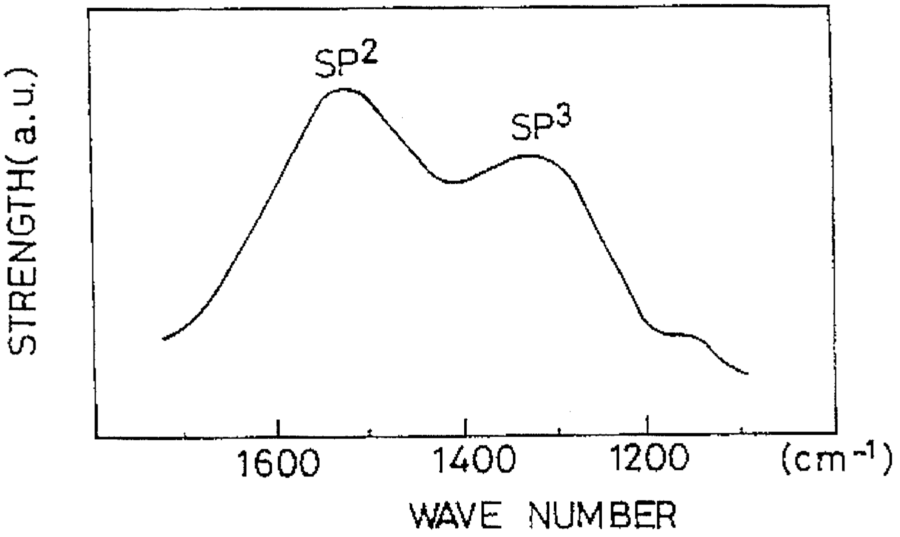
FIG. 3 is a spectrum chart illustrating the result of analysis by IR (Infra Red) spectrometry for a hard carbon insulating film.
Figure 4:
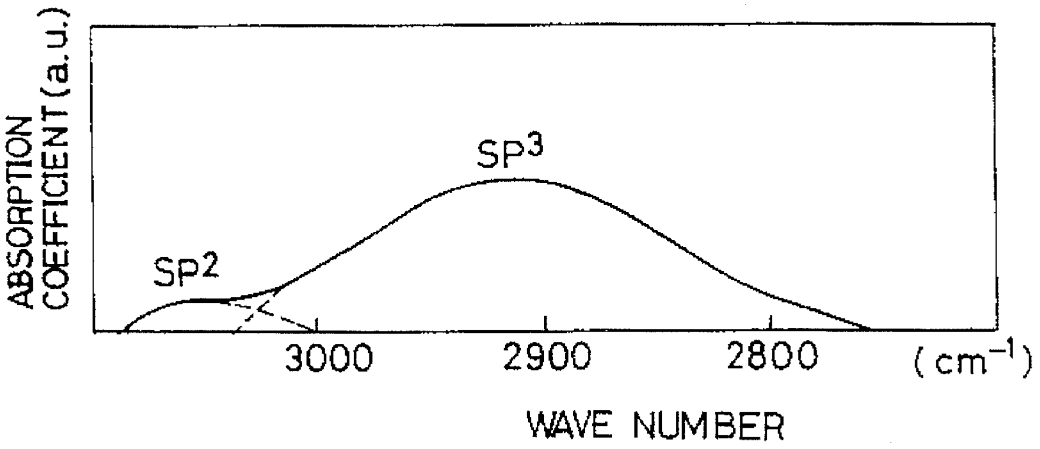
FIG. 4 is a spectrum chart showing the result of analysis by Raman spectrometry for the hard carbon film.
Figure 5:
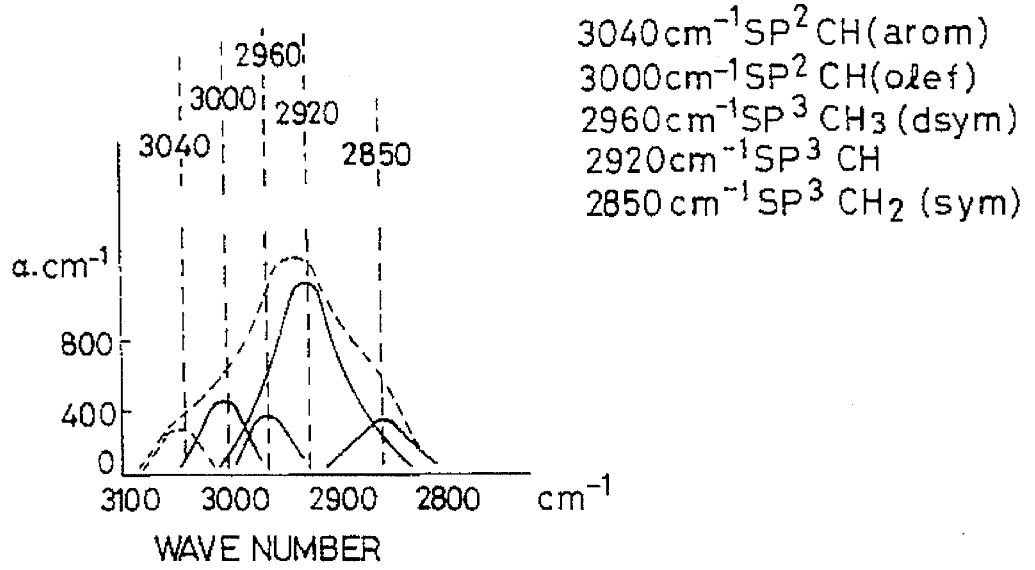
FIG. 5 is a Gauss distribution chart for the IR spectrum chart shown in FIG. 3.

When the formed hard carbon film is analyzed by Raman spectrometry and IR absorption method, as are shown on FIGS. 3 to 4, it is apparent that inter-atom bonds formed with $SP^3$ hybrid orbital and carbon atoms and inter-atom bonds formed with $SP^2$ hybrid orbital and carbon atoms are present together. The ratio of $SP^3$ bond and $SP^2$ bond can nearly be estimated by separating peaks of IR spectra. That is, in the IR spectra of the film, spectra of various modes from 2,800 to 3,150 $cm^{-1}$ are superposed and measured as shown by the dotted line in FIG. 5, and belonging of peaks to the respective number of waves are apparent and $SP^3/SP^2$ ratio can be determined by separating peaks by the Gaussian distribution as shown in FIG. 5, calculating respective peak areas and determining the ratio thereof. Further, based on X-ray and electron ray diffractometry, it has been found that the hard carbon film is in a complete amorphous state or in an amorphous state containing fine crystallites in a size of about 50 Å to several μm.

When a plasma CVD process, which is used frequently because the process is generally suitable for mass production, is applied to a formation of the hard carbon film, since a specific resistivity and a hardness of the film increase as a RF power is low, and a life of the active species increases as a pressure is low, the processing temperature of the plastic substrate can be lowered and the film having an improved homogeneity for a large area can be obtained. Further, since the plasma density reduces at a low pressure, it is further effective for an increase of the specific resistivity of the hard carbon film by utilizing a magnetic field confining effect.

Further, as a hard carbon film of good quality can be formed on the substrate by the method even at a low temperature of normal temperature to 150° C., it is optimum for lowering the temperature in the production process for the MIM device. Therefore, since a wide selection of materials for the substrate becomes possible and a control for the temperature of the substrate becomes easy, the method has an advantageous feature capable of obtaining a hard carbon film of large area with a homogeneous property.

Further, as can be seen from Table 2, the structure and the physical property of the hard carbon film can be controlled over a wide range and there is also an advantage that a degree of freedom for a design of the device features is big. Further, since the dielectric constant of the film is as low as 3 to 5 when compared with $Ta_2O_5$, $Al_2O_3$ and $SiN_x$ used so far as the insulating film material of the conventional MIM device, the size can be increased in preparing a device of the same electric capacitance and, accordingly, fine fabrication is no more necessary and as a result yield of the device is improved. However, judging from a relation with the driving condition, about 10:1 capacitance ratio between the liquid crystals and the MIM device is preferable. Further, as a device steepness, β, is in a following relation:

$$\beta \propto \frac{1}{\sqrt{\epsilon \cdot d}}$$

the steepness, β, increases when a dielectric constant, ε, of the hard carbon film is small and a ratio between an ON current, $I_{on}$, and an OFF current, $I_{off}$, can take a large value and accordingly, a liquid crystal display can be driven at a low duty ratio to realize a high density liquid crystal display. Further, since the hardness of the hard carbon film is high, the film is less injured by the rubbing treatment and improves the yield also.

In view of the above, use of the hard carbon insulating film in the MIM device makes it possible to realize a liquid crystal display device having high color gradation and high density at a low cost.

Further, different effects can also be given to the device by doping elements other than carbon and hydrogen, such as belonging to the groups III to V in the periodical table, to alkali metals, to alkaline earth metals, nitrogen, chalcogen series and halogen atoms, in the hard carbon film.

For example, when elements belonging to the groups III and V of the periodical table, to alkali metals, and to alkaline earth metals, nitrogen or oxygen is doped in the film as a constituent elements, the film thickness can be made twice to three times as compared with a non-doped film, and can prevent a generation of pinholes upon fabrication of the device and further improve the mechanical strength of the device remarkably.

Further, because a stability and a hardness of the film doped with elements belonging to the group IV of the periodical table, chalcogen series and halogen elements, nitrogen or oxygen are remarkably improved, the device of high reliability can be fabricated. An effect obtained by doping group IV element, chalcogen element, nitrogen and oxygen is the effect caused by a reduction of active double bonds in the film, while the adding effects of the halogen element are (1) promoting a decomposition of the starting gas by hydrogen abstraction reaction and reducing dangling bonds in the film and (2) substituting hydrogen in the C—H bond with halogen element X in the film-forming process and increasing the bonding energy (bonding energy of C—X is greater than that of C—H).

To dope the above elements into the film as a constituent element, a gas containing a compound or a molecule having above elements other than carbon and hydrogen in addition to a compound containing carbon and hydrogen is to be used.

As the compound containing an elements belonging to the group III of the periodical table, $B(OC_2H_5)_3$, $B_2H_6$, $BCl_3$, $BBr_3$, $BF_3$, $Al(O\text{-}i\text{-}C_3H_7)_3$, $(CH_3)_3Al$, $(C_2H_5)_3Al$, $(i\text{-}C_4H_9)_3Al$, $AlCl_3$, $Ga(O\text{-}i\text{-}C_3H_7)_3$, $(CH_3)_3Ga$, $(C_2H_5)_3Ga$, $GaCl_3$, $GaBr_3$, $(O\text{-}i\text{-}C_3H_7)_3In$ and $(C_2H_5)_3In$ can be exemplified.

As the compound containing an elements belonging to the group IV of the periodical table, $Si_3H_6$, $(C_2H_5)_3SiH$, $SiF_4$, $SiH_2Cl_2$, $SiCl_4$, $Si(OCH_3)_4$, $Si(OC_2H_5)_4$, $Si(OC_3H_7)_4$, $GeCl_4$, $GeH_4$, $Ge(OC_2H_5)4$, $Ge(C_2H_5)_4$, $(CH_3)_4Sn$, $(C_2H_5)_4Sn$ and $SnCl_4$ can be exemplified.

As the compound containing an elements belonging to the group V of the periodical table, $PH_3$, $PF_3$, $PF_5$, $PCl_2F_3$, $PCl_3$, $PCl_2F$, $PBr_3$, $PO(OCH_3)_3$, $P(C_2H_5)_3$, $POCl_3$, $ASH_3$, $AsCl_3$, $AsBr_3$, $AsF_3$, $AsF_5$, $AsCl_5$, $SbH_3$, $SbF_3$, $SbCl_3$ and $Sb(OC_2H_5)_3$ can be exemplified.

As the compound containing an alkali metal atom, $LiO\text{-}i\text{-}C_3H_7$, $NaO\text{-}i\text{-}C_3H_7$ and $KO\text{-}i\text{-}C_3H_7$ can be exemplified.

As the compound containing an alkaline earth metal atom, $Ca(OC_2H_5)_3$, $Mg(OC_2H_5)_2$ and $(C_2H_5)_2Mg$ can be exemplified.

As the compound containing nitrogen atom, an inorganic compound such as nitrogen gas and ammonia, an organic compound having a functional group such as an amino group and a cyano group and a nitrogen-containing heterocyclic compound can be exemplified.

As the compound containing oxygen atom, an inorganic compound such as oxygen gas, ozone, water (steam), hydrogen peroxide, carbon monoxide, carbon dioxide, carbon suboxide, nitrogen monoxide, nitrogen dioxide, dinitrogen trioxide, dinitrogen pentoxide and nitrogen trioxide, and organic compound having a functional group or bonding such as hydroxy group, aldehyde group, acyl group, ketone group, nitro group, nitroso group, sulfone group, ether bond, ester bond, peptide bonds and oxygen-containing heterocyclic group and, further, metal alkoxide can be exemplified.

As the compound containing the chalcogenic element, $H_2S$, $(CH_3)(CH_2)_4S(CH_2)_4CH_3$, $CH_2{=}CHCH_2SCH_2CH{=}CH_2$, $C_2H_5SC_2H_5$, $C_2H_5SCH_3$, thiophene, $H_2Se$, $(C_2H_5)_2Se$ and $H_2Te$ can be exemplified.

Further, as the compound containing a halogen atom, inorganic compound such as fluorine, chlorine, bromine, iodine, hydrogen fluoride, carbon fluoride, nitrogen fluoride, bromine fluoride, iodine fluoride, hydrogen chloride, bromine chloride, iodine chloride, hydrogen bromide, iodine bromide and hydrogen iodide, an organic compound such as halogenated alkyl, halogenated aryl, halogenated styrene, halogenated polymethylene and haloform can be exemplified.

As the hard carbon film suitable for the liquid crystal driving MIM device a film having thickness from 100 to 8,000 Å and a specific resistivity from $10^6$ to $10^{13}$ ohm.cm is preferable in view of driving conditions.

In view of a generation of pinholes and a uniform thickness of the film number of defects in the device caused by the pinholes becomes particularly remarkable when a film thickness is less than 300 Å and the ratio of defects per device exceeds 1%. Further, referring to a uniformity of the film thickness within a plane which affects the uniformity of the device properties, since a limit for an accuracy upon controlling the film thickness is 30 Å, deviation of the film thickness can not be reduced to less than 10% if the film thickness is less than 300 Å. Accordingly, it is preferable that the thickness of the hard carbon film is not smaller than 300 Å.

Further, for preventing peeling of the film due to an internal stress of the film and for driving at a low duty ratio, if possible, less than 1/1,000, the film thickness is preferably not larger than 4,000 Å.

EXAMPLE

The present invention will be explained referring to the examples but the invention is not restricted only to such examples.

EXAMPLE 1

Using a Pyrex as a transparent substrate, ITO was deposited thereon to a thickness of 800 Å by using magnetron sputtering. Then, it was patterned to form a picture element electrode.

Then, a MIM device using a hard carbon film was disposed as an active device as described below.

At first, Al was deposited to a thickness of 800 Å on the picture element electrode of the substrate by means of vapor deposition and patterned to form a lower electrode. Then, a hard carbon film was deposited as an insulating film to a thickness of 900 Å by means of plasma CVD and then patterned by means of a dry etching.

Further, Ni was deposited to a thickness of 1,000 Å on the hard carbon insulating film by vapor deposition and then patterned to form an upper electrode. ITO was deposited to a thickness of 1,000 Å on an opposite side substrate of polyester film and patterned into a stripe shape to form a common picture element electrode. Further, a color filter is disposed to the outside.

Then, a polyimide film was formed as an aligning film on each of the substrates and applied with a rubbing treatment.

Then, the substrates were opposed to each other with each of the picture element electrodes being inside and appended by a gap material to each other and, subsequently, liquid crystals (MCL 2001) were sealed in the thus formed cell to fabricate a color liquid crystal display device.

The conditions for forming the film of the hard carbon used in the MIM device were as shown below.

| | |
|---|---|
| Pressure | 0.03 Torr |
| $CH_4$ flow rate | 10 SCCM (standard $cm^3$ per minute) |
| RF power | 0.2 $W/cm^2$ |
| Temperature | Room temperature |

The line inversion driving according to the present invention was practiced to the liquid crystal display device by using the driving circuit shown in FIG. 10.

In the conventional line inversion driving, the driving voltage was 16 V at 1/8 bias, whereas the driving voltage was lowered to 13 V under the same condition and no scattering occurred in the display operated with the driving method according to the present invention. In addition, the contrast was also increased to improve the panel display characteristic.

EXAMPLE 2

Using a polyarylate film substrate as the transparent substrate, $SiO_x$ (in which x is 1.5 to 2.0) was coated to a thickness of 4,000 Å on both surfaces of the substrate and then ITO was deposited to a thickness of 1,000 Å by using magnetron sputtering. Then it was patterned to form a picture element electrode.

Then, a MIM device using a hard carbon film was disposed as an active device as described below.

At first, Al was deposited to a thickness of 600 Å on the picture element electrode of the substrate by vapor deposition and patterned to form a lower electrode. Then, a hard carbon film was deposited to a thickness of 1,100 Å as an insulating film by plasma CVD and then patterned by a dry etching.

Further, Ni was deposited to a thickness of 1,000 Å on the hard carbon insulating film by a vapor deposition and then patterned to form an upper electrode.

Then, using a flexible polyarylate film as the other substrate (opposite side substrate) ITO was deposited to a thickness of 1,000 Å thereon and patterned into a stripe shape to form a common picture element electrode. Further, a color filter is disposed to the surface of the substrate opposite to that disposed with the common picture element electrode.

Then, a polyimide films were formed as the aligning films on both of the substrates and applied with a rubbing treatment.

Then, the substrates were opposed to each other having the picture element electrodes inside and appended each other by putting gap materials therebetween and, subsequently, commercially available liquid crystals (MLC 2004) were sealed into the gap composed by the substrates and fabricated a color liquid crystal display device.

The conditions for forming the film of the hard carbon used in the MIM device were as shown below.

| | |
|---|---|
| Pressure | 0.05 Torr |
| $CH_4$ flow rate | 10 SCCM (standard $cm^3$ per minute) |
| RF power | 0.3 $W/cm^2$ |
| Temperature | Room temperature |

In the conventional line inversion driving, the driving voltage was 20 V at 1/10 bias, whereas the driving voltage was lowered to 18 V under the same condition and no scattering occurred in the display operated with the driving method according to the present invention. In addition, the contrast was also improved.

EXAMPLE 3

A MIM device was disposed on a Pyrex glass substrate as one of transparent substrates as shown below. After depositing Cr to a thickness of 1,000 Å by sputtering it was patterned to form a lower electrode. Then, an $SiN_x$ (x is 1.5 to 2.0) film was formed to a thickness of 800 Å from $SiH_4$ and $NH_3$ by P-CVD on the electrodes and then patterned to form an insulating film. Further, Cr was vapor deposited to a thickness of 2,000 Å and then patterned to form an upper electrode. Then, ITO was deposited to a thickness of 500 Å on the formed MIM device by a sputtering and then patterned to form a picture element electrode.

Then, using a Pyrex substrate as the opposite side substrate, ITO was depositted thereon to a thickness of 500 Å by a sputtering and then patterned into a stripe shape to form a common picture element electrode.

Further, the substrates were appended to each other by way of a gap material in a similar manner as Example 1 and commercially available liquid crystal (ZLI-4345) were sealed to fabricate a liquid crystal display device.

The driving voltage was 20 V in the conventional system, whereas the voltage was reduced to 17 V and no scattering occurred in the display in the driving method according to the present invention.

EXAMPLE 4

Ta was deposited to a thickness of 3,000 Å as a lower electrode on a glass substrate by a sputtering and then patterned. Then, the Ta film was electrolytically oxidized as an anode to form a $Ta_2O_5$ film to a thickness of 600 Å on the surface. Further, Cr was deposited to a thickness of 1,000 Å as an upper electrode by means of sputtering and then patterned.

A color liquid crystal display device was obtained in the same manner as in Example 1 except for the foregoing, in which the driving voltage was 25 V at 1/5 bias in the conventional driving method, whereas the driving voltage was lowered to 22 V and no scattering occurred in the display operated with the method according to the present invention.

EXAMPLE 5

Using a Pyrex glass substrate as a transparent substrate, ITO was deposited thereon to a thickness of 1,000 Å as a picture element electrode by an electron beam vapor deposition and then patterned. Then, Al was deposited to a thickness of 1,500 Å as a lower electrode by means of vapor deposition and then patterned.

Then, a hard carbon film was deposited to a thickness of 1,200 Å by a plasma CVD and then patterned by means of a dry etching. Further, Ni was deposited to a thickness of 1,500 Å as an upper electrode by an electron beam vapor deposition and then patterned.

Further, ITO was deposited to a thickness of 1,000 Å on a Pyrex glass substrate as the other transparent substrate by a sputtering and then patterned into a stripe shape to form a common picture element electrode.

Then, polyimide film was formed as the aligning film on the entire substrates and applied with a rubbing treatment.

Then, the substrates were opposed to each other having picture element electrodes inside and appended each other applying gap materials therebetween and liquid crystals (MLC-2000) were sealed between the substrates to make the cell and fabricated a color liquid crystal display device.

The conditions for forming the film of the hard carbon used in the MIM device were as shown below.

| | |
|---|---|
| Pressure | 0.02 Torr |
| $CH_4$ flow rate | 20 SCCM (standard $cm^3$ per minute) |
| RF power | 0.8 $W/cm^2$ |
| Temperature | 80 ° C. |

In the conventional line inversion driving method, the driving voltage was 22 V at 1/9 bias, whereas the driving voltage was lowered to 19 V under the same conditions and no scattering occurred in the display operated with the driving method according to the present invention. In addition, the contrast was also increased to improve the panel display characteristic.

EXAMPLE 6

A Pyrex glass substrate was used as the substrate on which were deposited 600 Å of ITO as a transparent substrate, 600 Å of Al as a lower electrode. 2.000 Å of hard carbon film and 800 Å of Ni as upper electrode, to fabricate a MIM device. A Pyrex glass substrate was used as an opposite substrate on which ITO was deposited to 600 Å and patterned into a stripe shape. Both of the substrates were appended to each other and TN liquid crystals (ZLa-1840) were microencapsulated and dispersed in a polymer (Polymethylmethacrylate) at a 1:1 weight ratio and then sealed between the substrates to form a liquid crystal panel.

The conditions for forming the film of the hard carbon used in the MIM device were as shown below.

| | |
|---|---|
| Pressure | 0.03 Torr |
| $CH_4$ flow rate | 30 SCCM (standard $cm^3$ per minute) |
| RF power | 0.4 $W/cm^2$ |
| Temperature | 30° C. |

The panel driving voltage was 60 V in the conventional line inversion driving, whereas driving was possible at 38 V in the driving method according to the present invention. Further, by adding a constant voltage of 4 V having an identical polarity, driving at 36 V was possible.

EXAMPLE 7

A MIM device using a hard carbon film of 1,800 Å thickness was used as a driving device and polymer dispersed liquid crystals prepared by dispersing liquid crystals (BL001) into a polyamide acrylate in a network structure at a 2:1 weight ratio was used as a liquid crystal layer.

The characteristic of the liquid crystals were: $V_{10}$=4 V; and $V_{90}$=9 V.

When the liquid crystal display device was driven by the conventional driving method, the driving voltage was 45 V. When the driving method according to the present invention was used, it could be operated at 34 V.

What is claimed is:

1. A method of operating an active matrix liquid crystal display device, said display device comprising, a pair of substrates, a liquid crystal layer sandwiched by the pair of said substrates, a plurality of picture element electrodes disposed in groups and disposed on at least one of said substrates, at least one active device disposed on each of said picture element electrodes, said method comprising the steps of:

applying a driving voltage to each of said picture element electrodes, said applied driving voltage being identical in polarity with each group of said picture element electrodes during a period from a selection in a $n_{th}$ frame to a selection in a $(n+1)_{th}$ frame, said each group of picture element electrodes corresponding to one scanning line;

adding a constant voltage being identical in polarity with said driving voltage at all times to said each group of picture element electrodes; and inverting said polarity of said applied driving voltage on every one of said selections in said frames, said selection for defining a timing for an inversion of said polarity of said applied driving voltage, wherein said timing for said inversion is shifted on every one of said scanning lines.

2. The method according to claim 1, wherein said liquid crystal layer comprises a film comprising a polymer-network type liquid crystal layer in which particulate liquid crystals are dispersed in and surrounded by a three-dimensional construction formed by the polymer.

3. The method according to claim 1, wherein said liquid crystal layer comprises a film comprising a polymer-matrix type liquid crystal layer in which particular liquid crystals are dispersed in the polymer-matrix.

4. An active matrix liquid crystal display device having a pair of substrates, a liquid crystal layer sandwiched by the pair of said substrates, a plurality of picture element electrodes disposed in groups and disposed on at least one of said substrates, at least one active device disposed on each of said picture element electrodes, comprising:

applying means for applying a driving voltage to each of said picture element electrodes, said applied driving voltage being identical in polarity with each group of said picture element electrodes during a period from a selection in a $n_{th}$ frame to a selection in a $(n+1)n_{th}$ frame, said each group of picture element electrodes corresponding to one scanning line;

adding means for adding a constant voltage being identical in polarity with said driving voltage at all times to said each group of picture element electrodes; and inverting means for inverting said polarity of said applied driving voltage on every one of said selections in said frames, said selection for defining a timing for an inversion of said polarity of said applied driving voltage, wherein said timing for said inversion is shifted on every one of said scanning lines.

5. The liquid crystal display device according to claim 4, wherein said liquid crystal layer comprises a film comprising a polymer-network type liquid crystal layer in which particular liquid crystals are dispersed in and surrounded by a three-dimensional construction formed by the polymer.

6. The liquid crystal display device according to claim 4, wherein said liquid crystal layer comprises a film comprising a polymer-matrix type liquid crystal layer in which particular liquid crystals are dispersed in the polymer-matrix.

* * * * *